(12) United States Patent
Anyuru (10) Patent No.: US 9,615,320 B2
(45) Date of Patent: Apr. 4, 2017

(54) SIM SELECTION

(71) Applicant: Telefonaktiebolaget L M Ericsson (Publ), Stockholm (SE)

(72) Inventor: Andreas Anyuru, Varnamo (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/898,736

(22) PCT Filed: Dec. 17, 2014

(86) PCT No.: PCT/EP2014/078161
§ 371 (c)(1),
(2) Date: Dec. 15, 2015

(87) PCT Pub. No.: WO2016/095980
PCT Pub. Date: Jun. 23, 2016

(65) Prior Publication Data
US 2016/0374014 A1   Dec. 22, 2016

(51) Int. Cl.
*H04W 4/00* (2009.01)
*H04W 48/18* (2009.01)
(Continued)

(52) U.S. Cl.
CPC .......... *H04W 48/18* (2013.01); *H04L 63/0853* (2013.01); *H04W 4/023* (2013.01); *H04W 88/06* (2013.01)

(58) Field of Classification Search
CPC ................................. H04L 1/20; H04W 4/003
(Continued)

(56) References Cited

U.S. PATENT DOCUMENTS

2005/0164737 A1* 7/2005 Brown ............. H04W 8/245
455/558
2010/0210304 A1 8/2010 Huslak
(Continued)

FOREIGN PATENT DOCUMENTS

| EP | 1850617 A1 | 10/2007 |
| EP | 2670175 A1 | 4/2013 |
| EP | 2741536 A1 | 6/2014 |

OTHER PUBLICATIONS

PCT International Search Report, mailed Sep. 10, 2015, in connection with International Application No. PCT/EP2014/078161, all pages.
(Continued)

*Primary Examiner* — Kiet Doan
(74) *Attorney, Agent, or Firm* — Leffler Intellectual Property Law, PLLC (57) ABSTRACT

A SIM selection method of a wireless communication device connectable to a first SIM associated with a first subscription in relation to a first wireless communication system and a second SIM associated with a second subscription in relation to a second wireless communication system. The method comprises obtaining current values of first second and third parameters. The first parameters are applicable in relation to the first SIM and in relation to the second SIM, and comprise a geographical location of the wireless communication device. The second and third parameters obtained for the first SIM are applicable in relation to the first SIM only and the second and third parameters obtained for the second SIM are applicable in relation to the second SIM only. The current values of the third parameters are based on values of the third parameters associated with the geographical location and uploaded to a server by a plurality of other wireless communication devices. The method also comprises receiving a SIM utilization request from an application of the
(Continued)

wireless communication device and selecting one of the first SIM and the second SIM for utilization by the application based on the current values of the first parameters, the second parameters, and the third parameters. Corresponding computer program product, SIM selector and wireless communication device are also disclosed.

15 Claims, 2 Drawing Sheets

(51) Int. Cl.
*H04W 4/02* (2009.01)
*H04L 29/06* (2006.01)
*H04W 88/06* (2009.01)

(58) Field of Classification Search
USPC ...... 455/435.1, 558, 419, 418, 404.1, 432.1, 455/423; 370/331, 352, 338
See application file for complete search history.

(56) References Cited

U.S. PATENT DOCUMENTS

| | | |
|---|---|---|
| 2010/0311402 A1 | 12/2010 | Srinivasan et al. |
| 2011/0117909 A1 | 5/2011 | Cao et al. |
| 2012/0309344 A1 | 12/2012 | Ferrazzini et al. |
| 2013/0137484 A1 | 5/2013 | Torres |
| 2013/0310035 A1* | 11/2013 | Gouriou .............. H04W 60/005 455/435.1 |
| 2014/0031035 A1 | 1/2014 | Tagg et al. |
| 2014/0038601 A1* | 2/2014 | Gouriou ................ H04W 8/183 455/435.1 |

OTHER PUBLICATIONS

Murtaza M A et al., Stochastic Optimal SIM Selection for Multi-SIM Cell-Phone Architecture Using Semi-Markov Decision Processes, Vehicular Technology Conference (VTC Fall), 2012 IEEE, Sep. 3, 2012, pp. 1-5.
IP.com Journal, Intelligent Cloud Access Valve for Multi-SIM Enabled Devices, IP.com Electronic Publication: Feb. 22, 2013, 5 pages.

* cited by examiner

SIM SELECTION

TECHNICAL FIELD

The present invention relates generally to the field of wireless communication. More particularly, it relates to selection of subscriber identity module (SIM) in a wireless communication device comprising more than one SIM.

BACKGROUND

A dual SIM mobile phone is a wireless communication device (also referred to herein as a device or a phone) that is adapted to comprise two SIM cards. More generally, such mobile phones may be referred to as multi-SIM devices, which also includes wireless communication devices adapted to comprise more than two SIM cards, e.g. triple SIM mobile phones.

The dual SIM scenario will be used herein for illustrative purposes. It should be noted that this does not exclude applicability to other multi-SIM scenarios.

Dual SIM devices may be beneficial for several reasons, for example, for a user that has a private SIM and a SIM provided by an employer of the user but only wants to carry a single phone, for a user that often travels between two or more different countries and wants to use different operators in the different countries to achieve cheapest rate or best service, and for a user that lives in an area where one single operator cannot provide acceptable service.

There are several different types of dual SIM phones that are more or less advanced. The most basic dual SIM phone is dual SIM single standby (DSSS) can only be registered in relation to one network (corresponding to one SIM). A slightly more advanced dual SIM phone is dual SIM dual standby (DSDS) which can be registered—and idle—in relation to two networks (corresponding to two SIMs) simultaneously, but is only able to be connected to one network at a time (during which time it is not able to be idle or connected in relation to the other network). An even more advanced dual SIM phone is dual SIM dual call (DSDC) or dual SIM dual active (DSDA), which can be connected to two networks (corresponding to two SIMs) simultaneously.

Typically, the selection of which SIM to use for a device initiated connection (e.g. an outgoing call) is implemented by letting the user of the device manually select which SIM to use. A problem with this approach is that it may be difficult for the user to make an optimal, preferable, or even acceptable selection in terms of various parameters and for each application using a device initiated connection.

For example, which SIM is most beneficial to use may depend on the time of the day, the day of the week, location of the device, etc. A few illustrative example scenarios of the complexity involved in SIM selection include:

Some applications (e.g. the private social networking applications) should always use a private SIM, some applications should always use the SIM corresponding to the network that currently has the best packet switched connection, while other applications (e.g. telephony) should use an employer SIM during work hours and work days and a private SIM otherwise. The selection between employer and private SIM may, alternatively or additionally, be dependent on the receiver (private or work related contact) of the outgoing connection.

For web applications (which are typically executed within a web browser of the device) it is not enough that the SIM selection differentiates between e.g. "a browser application", "a telephony application", "an email application", etc. but differentiation between different web applications for SIM selection may be needed.

One SIM may be beneficial in terms of power efficiency, throughput, coverage, bandwidth, price plan, and/or service in relation to a certain location, city, country, radio access technology, receiver of connection, etc.

US 2012/0309344 A1 discloses two or more SIM cards being installed in a single mobile device and automated selection of a user account by analyzing a plurality of user accounts on the mobile device and selecting a user account based on the analysis. A determination of which user account to use can be based on an analysis of a plurality of parameters, which might include the type of user account e.g. work or personal), billing rate, battery level, bandwidth, data rate, efficiency of application execution, available technology, and/or other contextual information.

A problem with this approach is that it may result in a sub-optimal selection when values are not available for all relevant parameters.

Therefore, there is a need for improved approaches to SIM selection in relation to a wireless communication device connectable to two or more SIMs.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

According to a first aspect this is achieved by a SIM selection method of a wireless communication device connectable to a first SIM associated with a first subscription in relation to a first wireless communication system and a second SIM associated with a second subscription in relation to a second wireless communication system.

The method comprises obtaining current values of one or more first parameters, wherein the first parameters are applicable in relation to the first SIM and in relation to the second SIM, and wherein the one or more first parameters comprise a geographical location of the wireless communication device.

The method also comprises obtaining (for each of the first SIM and the second SIM) current values of one or more second parameters, wherein the second parameters obtained for the first SIM are applicable in relation to the first SIM only and the second parameters obtained for the second SIM are applicable in relation to the second SIM only.

The method also comprises obtaining (from a remote server and for at least one of the first SIM and the second SIM and based on the geographical location) current values of one or more third parameters, wherein the third parameters obtained for the first SIM are applicable in relation to the first SIM only and the third parameters obtained for the second SIM are applicable in relation to the second SIM only, and wherein the current values of the third parameters are based on values of the third parameters associated with the geographical location and uploaded to the server by a plurality of other wireless communication devices.

The method further comprises receiving a SIM utilization request from an application of the wireless communication device, and selecting one of the first SIM and the second SIM for utilization by the application based on the current values of the first parameters, the second parameters, and the third parameters.

When a SIM is referred to herein, it is to be understood that it may be a physical SIM card, a virtual SIM, or any other suitable subscriber identity module.

The first and second wireless communication systems may or may not be the same wireless communication system and/or may or may not be provided by the same operator.

The remote server may be external to the wireless communication device. The remote server may be located externally to any operator network. For example, the remote server may be implemented as a server reachable via the Internet.

The values of the one or more third parameters are typically dynamic values. For example, the values of the one or more third parameters may be determined as a (possibly weighted) average value or filtered value based on the values of the third parameters uploaded by the plurality of other wireless communication devices.

The SIM utilization request may be related to a new connection setup or a SIM re-selection during an ongoing connection.

In some embodiments, the first parameters may be device specific parameters, the second parameters may be SIM specific parameters (e.g. determined by the wireless communication device), and/or the third parameters may be system specific parameters (e.g. determined by a plurality of wireless communication devices).

Furthermore, one or more fourth parameters may be used to complement the third parameters according to some embodiments. The fourth parameters may, for example, be system specific parameters (e.g. known to, or determined by, the wireless communication system). The fourth parameters may, for example, include a location of a base station of the wireless communication system.

In some embodiments, the method may further comprise transmitting one or more of the current values of the one or more second parameters to the remote server for updating corresponding third parameters of the remote server. This may be seen as an analogy to uploading of values of the third parameters to the server by the plurality of other wireless communication devices.

In some embodiments, the method may further comprise performing measurements during communication using the selected SIM and updating the current values of the one or more second parameters based on the measurements.

Selecting one of the first SIM and the second SIM for utilization by the application may be further based on one or more application specific parameters according to some embodiments.

In some embodiments, the one or more first parameters may further comprise one or more of a time, a date, and a battery level.

In some embodiments, the one or more second parameters may comprise one or more of a price plan of the subscription, a distance to a base station of the wireless communication system, a bandwidth of the wireless communication system, a latency of the wireless communication system, a signal strength of the wireless communication system, and a signal-to-interference ratio of the wireless communication system.

In some embodiments, the one or more third parameters may comprise one or more of a distance to a base station of the wireless communication system, a bandwidth of the wireless communication system, a latency of the wireless communication system, a signal strength of the wireless communication system, and a signal-to-interference ratio of the wireless communication system.

Selecting one of the first SIM and the second SIM for utilization by the application may, according to some embodiments, comprise assigning a parameter specific rating to each of the first SIM and the second SIM for each of the current values of the first parameters, the second parameters, and the third parameters, accumulating the parameter specific ratings for each of the first SIM and the second SIM, and selecting the first SIM if its accumulated rating indicates that it is more favorable than the second SIM and selecting the second SIM otherwise.

A second aspect is a computer program product comprising a computer readable medium, having thereon a computer program comprising program instructions. The computer program is loadable into a data-processing unit and adapted to cause execution of the method according to the first aspect when the computer program is run by the data-processing unit.

A third aspect is a SIM selector for a wireless communication device connectable to a first SIM associated with a first subscription in relation to a first wireless communication system and a second SIM associated with a second subscription in relation to a second wireless communication system.

The SIM selector comprises one or more current parameter value inputs, an application interface, and a selection unit.

The one or more current parameter value inputs are adapted to obtain current values of one or more first parameters, wherein the first parameters are applicable in relation to the first SIM and in relation to the second SIM, and wherein the one or more first parameters comprise a geographical location of the wireless communication device.

The one or more current parameter value inputs are also adapted to obtain (for each of the first SIM and the second SIM) current values of one or more second parameters, wherein the second parameters obtained for the first SIM are applicable in relation to the first SIM only and the second parameters obtained for the second SIM are applicable in relation to the second SIM only.

The one or more current parameter value inputs are also adapted to obtain (from a remote server and for at least one of the first SIM and the second SIM and based on the geographical location) current values of one or more third parameters, wherein the third parameters obtained for the first SIM are applicable in relation to the first SIM only and the third parameters obtained for the second SIM are applicable in relation to the second SIM only, and wherein the current values of the third parameters are based on values of the third parameters associated with the geographical location and uploaded to the server by a plurality of other wireless communication devices.

The application interface is adapted to receive a SIM utilization request from an application of the wireless communication device.

The selection unit is adapted to select one of the first SIM and the second SIM for utilization by the application based on the current values of the first parameters, the second parameters, and the third parameters.

In some embodiments, one or more of the current parameter value inputs may be operatively connectable to a receiver of the wireless communication device for obtaining the current values of one or more third parameters by receiving the current values of the one or more third parameters from the remote server.

The SEM selector may further comprise one or more current parameter value outputs according to some embodiments, operatively connectable to a transmitter of the wireless communication device for transmitting one or more of the current values of the one or more second parameters to the remote server for updating corresponding third parameters of the remote server.

In some embodiments, the SIM selector may be further adapted to update the current values of the one or more second parameters based on measurements performed during communication using the selected SIM.

In some embodiments, the selection unit may be adapted to further base the selection of one of the first SIM and the second SIM for utilization by the application on one or more application specific parameters.

In some embodiments, the selection unit may be adapted to select one of the first SIM and the second SIM for utilization by the application by assigning a parameter specific rating to each of the first SIM and the second SIM for each of the current values of the first parameters, the second parameters, and the third parameters, accumulating the parameter specific ratings for each of the first SIM and the second SIM, and selecting the first SIM if its accumulated rating indicates that it is more favorable than the second SIM and selecting the second SIM otherwise.

A fourth aspect is a wireless communication device comprising the arrangement according to the third aspect.

In some embodiments, the third and fourth aspects may additionally have features identical with or corresponding to any of the various features as explained above for the first aspect.

An advantage of some embodiments is that the SIM selection is improved in cases when the wireless communication device does not have any (or has very poor) statistic of its own relating to one or more parameters relevant for the SIM selection. This scenario may occur, for example, if the wireless communication device is in a location where it has not been before (or is very seldom). In such scenarios, the wireless communication device benefit from parameter values obtained by other wireless communication devices.

Another advantage of some embodiments is that a possibility is provided to improve efficiency (e.g. in terms of power and/or performance) for the wireless communication device.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where SIM selection is enabled in a wireless communication device connectable to at least first and second SIMs associated with respective subscriptions in relation to respective wireless communication system.

Figure 1:
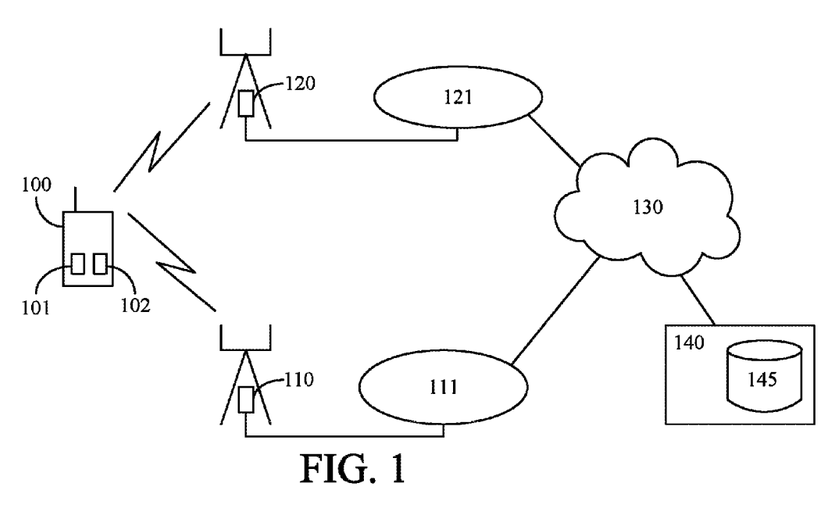
FIG. 1 is a schematic drawing illustrating an example situation according to some embodiments.

FIG. 1 illustrates an example situation where some embodiments may be applicable. A wireless communication device 100 comprises two SIMs 101, 102 associated with respective wireless communication systems 111, 121 (e.g. EPC—Evolved Packet Core). Thus, the wireless communication device 100 may communicate with any of the wireless communication systems 111, 121 through respective base stations 110, 120 (e.g. eNodeB) of the wireless communication systems. A server 140 is reachable from any of the wireless communication systems 111, 121 via the Internet (or another suitable cloud service).

The server 140 comprises a database 145 for storing of parameter values (e.g. of third and fourth parameters) in association with respective geographical locations. Each of the parameter values of the database 145 may be based on (e.g. average or filtered) parameter values uploaded to the server by a plurality of wireless communication devices which may or may not include the wireless communication device 100) and/or parameter values uploaded to the server by the wireless communication systems 111, 121.

The wireless communication device 100 comprises a SIM selector adapted to select one of the two SIMs 101, 102 for a connection initiated by the wireless communication device 100. The selection is based on one or more parameter values of the database 145 that the wireless communication device obtains from the server 140.

Figure 2:
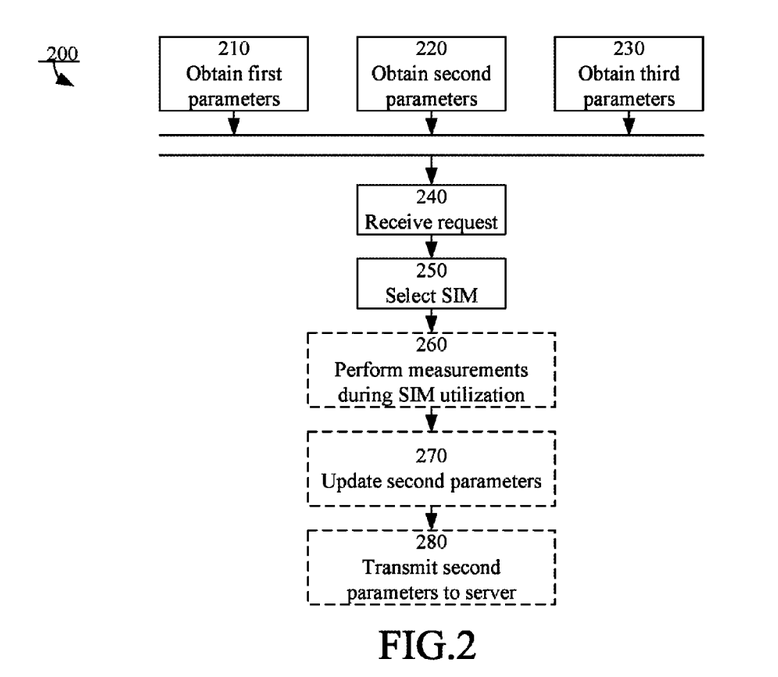
FIG. 2 is a flowchart illustrating example method steps according to some embodiments.

FIG. 2 illustrates an example method 200 according to some embodiments. The method 200 is a SIM selection method for a wireless communication device connectable to first and second SIMs associated with respective subscriptions in relation to respective wireless communication systems. The method 200 may, for example, be performed by the wireless communication device 100 of FIG. 1.

In step 210, current values of first parameters are obtained. The first parameters are applicable in relation to the both SIMs and comprise at least a geographical location of the wireless communication device. The first parameters may further comprise one or more of a time, a date, and a battery level. The first parameters may be regarded as device specific parameters. Obtaining the current values of the first parameters may be achieved by any suitable method. For example, the geographical location may be achieved by using GNSS (global navigation satellite system, e.g. GPS—global positioning system).

In step 220, current values of second parameters are obtained for each of the SIMs. Each of the values of the second parameters is applicable in relation to only one SIM. The second parameters may comprise one or more of a subscription price plan, a distance to a base station, a system bandwidth, system latency, a signal strength, and a signal-to-interference ratio. The second parameters may be regarded as SIM specific parameters. Obtaining the current values of the first parameters may be achieved by any suitable method. For example, the signal strength may be achieved by performing measurements.

In step 230, current values (associated with the geographical location) of third parameters are obtained for one or more of the SIMs. Each of the values of the third parameters is applicable in relation to only one SIM. The second parameters may comprise one or more of a distance to a base station, a system bandwidth, system latency, signal strength, and a signal-to-interference ratio. The second parameters may be regarded as system specific parameters. The current values of the third parameters are obtained from a remote server and are based on values of the third parameters associated with the geographical location uploaded to the server by a plurality of other wireless communication devices.

Steps 210, 220 and 230 may be performed in parallel or in sequence as suitable. For example, the method may comprise first downloading (230) parameter values from the server for a plurality of geographical location, then determining (210) a current geographical location and thereafter extracting (230) the parameter values for that particular geographical location from the downloaded data.

Each of the steps 210, 220 and 230 may be performed repeatedly with some suitable time interval (such that current parameter values are always available) or may be event triggered (e.g. such that current parameter values are obtained only when they are needed).

In step 240, a SIM utilization request is received from an application of the wireless communication device. The SIM utilization request may, for example, be triggered by a user initiating a call or an application initiating an update procedure.

In step 250, one of the SIMs is selected for the requested SIM utilization. The selection is based on the current values of the first, second and third parameters.

When the second and third parameters have different current values for a same parameter (e.g. signal strength) preference may be given to either of the current values or a (possibly weighted) average may be used.

The selection may additionally be based on one or more application specific parameters. For example, some applications may favor a particular SIM (e.g. private SIM for social network applications).

The SIM selection in step 250 may comprise assigning a rating to each of the SIMs for each (or at least some) of the parameters, accumulating the ratings for each of the SIMs, and selecting the SIM having more favorable rating than the other SIMs.

This is illustrated by the following example, where SIM 2 will be selected since it has the highest ranking (in this example, a high rating value for a SIM indicates that using that SIM would be favorable with regard to the corresponding parameter):

|  | Rating SIM 1 | Rating SIM 2 |
| --- | --- | --- |
| Radio frequency interference | 0.2 | 1.0 |
| System latency | 0.8 | 1.0 |
| Distance to base station | 1.0 | 0.1 |
| Price model | 0.5 | 0.3 |
| Available bandwidth | 0.3 | 0.6 |
| Total | 2.8 | 3.0 |

During communication using the selected SIM, measurements may be performed as illustrated in step 260. The measurements may be in relation to any of the second parameters (e.g. signal strength measurements). The current values of the second parameters may be updated based on the measurements as illustrated by step 270.

In step 280, one or more of the (possibly updated) current values of the second parameters are transmitted to the remote server for updating corresponding third parameters of the remote server. Step 280 may be performed repeatedly with some suitable time interval or may be event triggered (e.g. performed each time the second parameters are updated).

Figure 3:
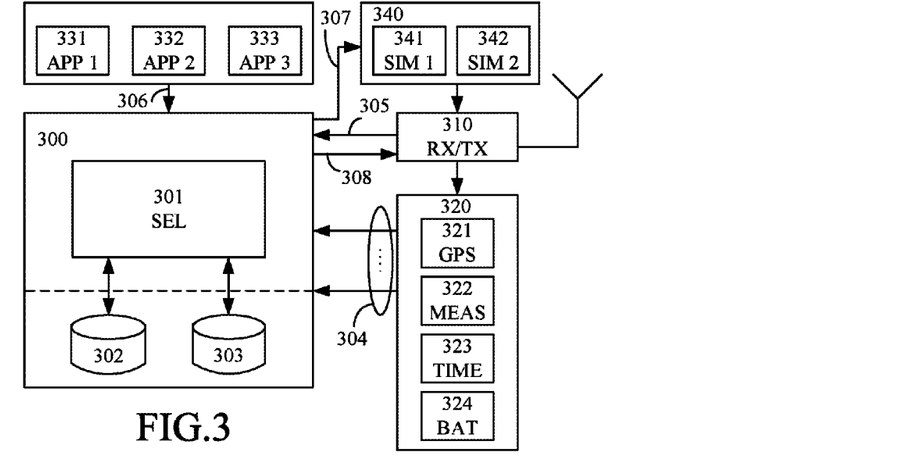
FIG. 3 is a block diagram illustrating an arrangement comprising an example SIM selector according to some embodiments.

FIG. 3 illustrates an arrangement comprising an example SIM selector 300 according to some embodiments.

The arrangement of FIG. 3 is for a wireless communication device comprising a SIM holder 340 connectable to a first SIM (SIM 1) 341 and a second SIM (SIM 2) 342 associated with respective subscriptions in relation to respective wireless communication systems.

The arrangement of FIG. 3 may, for example, be comprised in the wireless communication device 100 of FIG. 1 and/or may be adapted to perform the method described in connection to FIG. 2.

The arrangement of FIG. 3 comprises a SIM selector 300, which in turn comprises one or more current parameter value inputs 304, 305, an application interface 306 and a selection unit (SEL) 301.

The current parameter value inputs 304 are adapted to obtain current values of one or more first and/or second parameters (compare with steps 210 and 220 of FIG. 2) from suitable units 320 of the wireless communication device. In the example illustrated in FIG. 3 the units 320 include a GPS 321 for providing a geographical location, a measuring unit (MEAS) 322 for providing an estimation of e.g. signal strength and/or signal-to-noise ratio, a time unit (TIME) 323 for providing a current time, weekday and/or date, and a battery level indicator (BAT) 324 for providing a current energy level of a battery of the wireless communication device.

The current parameter value inputs 305 are adapted to obtain current values of one or more third parameters (compare with step 230 of FIG. 2) from a remote server via a receiver (illustrated as a transceiver (RX/TX) 310 in FIG. 3) of the wireless communication device.

The SIM selector 300 may comprise (or be connected to) storage units 302, 303 for storing of the current values of the second and third parameters, respectively. In some embodiments, stored values of the second parameters are (possibly weighted) averaged or filtered versions of the current values.

The application interface 306 is adapted to receive a SIM utilization request from an application (APP 1, APP 2, APP 3) 331, 332, 333 of the wireless communication device (compare with step 240 of FIG. 2).

The selection unit 301 is adapted to (in response to reception of the SIM utilization request) select one of the SIMs 341, 342 for utilization by the application (compare with step 250 of FIG. 2). The selection is based on the current values of the first parameters (obtained via inputs 304), the second parameters (obtained via inputs 304 and stored in storage 302), and the third parameters (obtained via input 305 and stored in storage 303).

During communication using the selected SIM, measurements may be performed (e.g. by the measurement unit 322) to estimate new values of one or more of the second parameters. The corresponding values of the second parameters stored in 302 may be updated based on the measurements.

The SIM selector also comprises a current parameter value output 308 operatively connectable to a transmitter (here; the transceiver 310) for transmitting one values of the second parameters stored in 302 to the remote server for updating corresponding third parameters of the remote server.

In an illustrative example of a wireless communication device (UE) comprising a SIM selector (also termed "Multi SIM Smart Selector"); the "Multi SIM Smart Selector" contains a current SIM1 Connection Status and a current SIM2 Connection Status. The Connection status comprises parameters such as RF-interference, latency, estimation of available bandwidth, price-plan, and distance to eNodeB for the connection associated with each SIM.

The connection status for each SIM is updated with input from sensors and modules comprised in the UE and typically outside the "Multi SIM Smart Selector" (compare with 304 of FIG. 3). These different inputs may be provided to the "Multi SIM Smart Selector" at different intervals.

The Connection Status may be calculated by performing a weighted moving average over time of the different inputs. The weighted moving average may have a certain time-window so that only samples inside this window are included in the average and the weight could be set so that the most recent values are given highest weight. The windows for the different inputs may have different lengths.

Further, the "Multi SIM Smart Selector" contains an Overall Policy Model which is based on saved data from previous connections using the different SIMs. The Overall Policy Model is a combination of the Local Policy Model which is mainly relevant to this specific UE and a cached version of the "Aggregated Cloud Policy" which may be relevant for all UEs with "Multi SIM Smart Selector" capabilities.

Since the Local Policy Model consists of policies that are mainly relevant to this specific UE, the local policy model may, for example, be updated with feedback from decisions that the user of this specific LIE has made. The local policy model is not shared with the policy sharing server in the cloud since there is no guarantee that these policies make sense for other UEs.

An example of a policy in the local policy model could be that that the user has selected that a certain application should use a certain SIM. The reason for this could be that a specific application should be configured to use the employer SIM during work hours. This is typically something that is only relevant for the user of this UE.

Some policies can be relevant to keep both in the local policy model and the cloud policy model. An example could be which SIM is preferred to use when calling or sending SMS to a certain phone number. The reason might be that if the user has a SIM from the same operator as the contact of the certain phone number there might be a better price plan. If the user of the UE makes a selection regarding this it would be used to update the local policy model, but information about different price plans between different operators and phone numbers can also be stored in the "Cloud Policy Model".

The Cloud Policy Model consists of policies that are relevant to all (or at least several) UEs which contain the "Multi SIM Smart Selector". An example could be that, for a certain time during the day at a specific position, the throughput is very bad for a certain network and SIM. By updating the cloud policy model and later synchronizing it with the cloud (compare with 305, 308 of FIG. 3), other UEs can make use of this information when they synchronize their cached cloud policy model even if they have not been at the location before.

So one advantage with the Cloud Policy model is that a UE could arrive to a location where it has not been before and the Cloud Policy Model would still be used by the "Multi SIM Smart Selector" to make the best possible (or at least beneficial) selection of which SIM that should be used for a certain connection.

The Cloud Policy Model also has the advantage that it can utilize feedback from a large number of UEs and use this information in for example a logistic regression model.

Note that the Cloud Policy Model only contains a model based on saved historic data. This is why the current Connection Status for the SIMs complements the decisions performed by the "Multi SIM Smart Selector" by taking current measurement and estimates into account.

For example, if the multi SIM functionality is implemented by physically or logically separated modems, where each physical or logical modem has a maximum bandwidth, the current Connection Status may try to keep track of how much of the available bandwidth is currently used. If, for example, the UE has support for one UNITS LTE cat6 (Universal Mobile Telecommunication Standard, Long Term Evolution, category 6) modem with a maximum bandwidth of 300 Mbps and one UMTS LIE cat4 modem with a maximum bandwidth of 150 Mbps, the cat6 modem might be preferred by the "Multi SIM Smart Selector" for a request from an application that needs as high throughput as possible as long as there are no other high bandwidth connection on any of the SIMs. However, if there are already other applications utilizing the UNITS LTE cat6 modem, the "Multi SIM Smart Selector" may select the cat4 modem for the new request.

The "Multi SIM Smart Selector" also takes inputs that are common to the complete UE (e.g. Time and Date, Geo-location, Battery Level) and not specific to each SIM (compare with 304 of FIG. 3).

Generally, the SIM selection as described herein may be used in three different modes: manual, semi-automatic and automatic. In the manual mode, the user may have to activate the SIM selection for each particular connection. In the semi-automatic mode, the SIM selection is presented as a suggestion to the user who decides whether to use it or not. In automatic mode, the SIM selection is applied without any user interaction.

Figure 4:
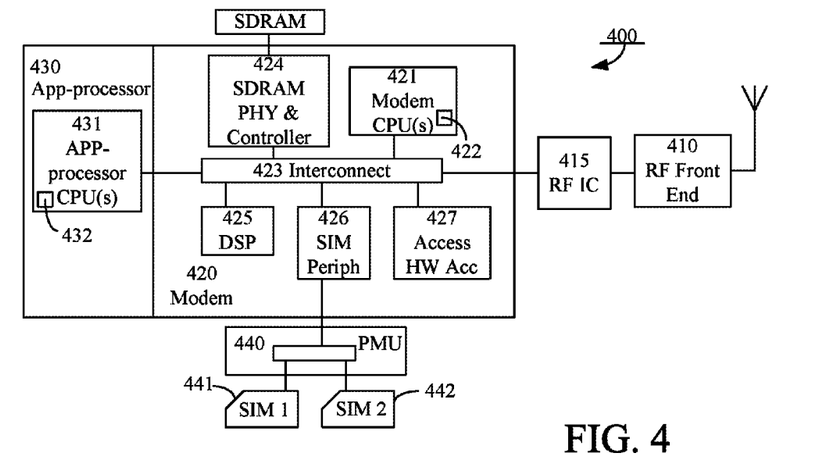
FIG. 4 is a block diagram illustrating an example arrangement for a wireless communication device according to some embodiments.

FIG. 4 illustrates an example arrangement 400 for a wireless communication device according to some embodiments.

The arrangement 400 is for a wireless communication device connectable to a first SIM (SIM 1) 441 and a second SIM (SIM 2) 442 associated with respective subscriptions in relation to respective wireless communication systems.

The arrangement 400 may, for example, be comprised in the wireless communication device 100 of FIG. 1 and/or may be adapted to perform the method described in connection to FIG. 2. Furthermore, the arrangement 400 may be combined with that of FIG. 3 in any suitable manner.

The arrangement 400 comprises an application processor 430 with one or more application processor central processing units (CPU) 431 connected to an interconnector 423 of a modem 420. The interconnector 423 is also connected to a radio frequency (RF) integrated circuit (IC) 415 which is in turn connected to a radio frequency front end 410. The modem 420 comprises a digital signal processor (DSP) 425, access hardware (HW) accelerator(s) 427, one or more modem CPUs 421, all connected to the interconnector 423. The modem 420 also comprises a SIM peripheral unit 426 connected to the interconnector 423 and to a power management unit (PMU) 440 which is in turn connectable to the first and second SIMs 441, 442. The modem 420 also comprises a SDRAM, PHY and controller unit 424 connected to the interconnector 423 and to a Static Dynamic Random Access Memory (SDRAM).

The SIM selector may, for example, be implemented as comprised in one or more of the application processor CPU(s) as illustrated by 432 and/or as comprised in one or more of the modem CPU(s) as illustrated by 421. Alternatively, the SIM selector may be implemented as a separate processing node.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a communicator, an electronic organizer, a smartphone, a computer, a notebook, or a mobile gaming device.

Figure 5:
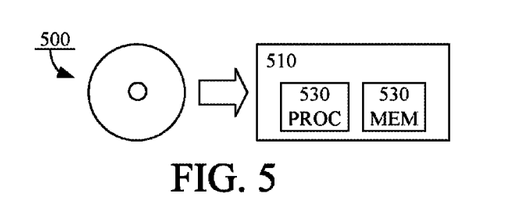
FIG. 5 is a schematic drawing illustrating a computer readable medium according to some embodiments.

According to some embodiments, a computer program product comprises a computer readable medium such as, for example, a diskette, a USB-stick, a plug-in card, an embedded drive, or a CD-ROM (as illustrated by 500 in FIG. 5). The computer readable medium 500 may have stored thereon a computer program comprising program instructions. The computer program may be loadable into a data-processing unit (PROC) 530, which may, for example, be comprised in a wireless communication device 510. When loaded into the data-processing unit, the computer program may be stored in a memory (MEM) 530 associated with or integral to the data-processing unit. According to some embodiments, the computer program may, when loaded into and run by the data-processing unit, cause the data-processing unit to execute method steps according to, for example, the method shown in FIG. 2.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A subscriber identity module (SIM) selection method of a wireless communication device connectable to a first SIM associated with a first subscription in relation to a first wireless communication system and a second SIM associated with a second subscription in relation to a second wireless communication system, the method comprising:

Obtaining, current values of one or more first parameters, wherein the first parameters are applicable in relation to the first SIM and in relation to the second SIM, and wherein the one or more first parameters comprise a geographical location of the wireless communication device;

obtaining, for each of the first SIM and the second SIM, current values of one or more second parameters, wherein the second parameters obtained for the first SIM are applicable in relation to the first SIM only and the second parameters obtained for the second SIM are applicable in relation to the second SIM only;

obtaining, from a remote server and for at least one of the first SIM and the second SIM and based on the geographical location, current values of one or more third parameters, wherein the third parameters obtained for the first SIM are applicable in relation to the first SIM only and the third parameters obtained for the second SIM are applicable in relation to the second SIM only, and wherein the current values of the third parameters are based on values of the third parameters associated with the geographical location and uploaded to the server by a plurality of other wireless communication devices;

receiving a SIM utilization request from an application of the wireless communication device; and selecting one of the first SIM and the second SIM for utilization by the application based on the current values of the first parameters, the second parameters, and the third parameters;

wherein the one or more second parameters comprise one or more of a price plan of the subscription, a distance to a base station of the wireless communication system, a bandwidth of the wireless communication system, a latency of the wireless communication system, a signal strength of the wireless communication system, and a signal-to-interference ratio of the wireless communication system.

2. The method of claim 1 further comprising transmitting one or more of the current values of the one or more second parameters to the remote server for updating corresponding third parameters of the remote server.

3. The method of claim 1, further comprising performing measurements during communication using the selected SIM and updating the current values of the one or more second parameters based on the measurements.

4. The method of claim 1, wherein selecting one of the first SIM and the second SIM for utilization by the application is further based on one or more application specific parameters.

5. The method of claim 1, wherein the one or more first parameters further comprise one or more of a time, a date, and a battery level.

6. The method of claim 1, wherein the one or more third parameters comprise one or more of a distance to a base station of the wireless communication system, a bandwidth of the wireless communication system, a latency of the wireless communication system, a signal strength of the wireless communication system, and a signal-to-interference ratio of the wireless communication system.

7. The method of claim 1, wherein selecting one of the first SIM and the second SIM for utilization by the application comprises:

assigning a parameter specific rating to each of the first SIM and the second SIM for each of the current values of the first parameters, the second parameters, and the third parameters;

accumulating the parameter specific ratings for each of the first SIM and the second SIM; and selecting the first SIM if its accumulated rating indicates that it is more favorable than the second SIM and selecting the second SIM otherwise.

8. A nontransitory computer readable storage medium, having thereon a computer program comprising program instructions, the computer program being loadable into a data-processing unit and adapted to cause execution of a method according when the computer program is run by the data-processing unit, wherein the method is a subscriber identity module (SIM) selection method of a wireless communication device connectable to a first SIM associated with a first subscription in relation to a first wireless communication system and a second SIM associated with a second subscription in relation to a second wireless communication system, the method comprising:

obtaining current values of one or more first parameters, wherein the first parameters are applicable in relation to the first SIM and in relation to the second SIM, and wherein the one or more first parameters comprise a geographical location of the wireless communication device;

obtaining, for each of the first SIM and the second SIM, current values of one or more second parameters, wherein the second parameters obtained for the first SIM are applicable in relation to the first SIM only and the second parameters obtained for the second SIM are applicable in relation to the second SIM only;

obtaining, from a remote server and for at least one of the first SIM and the second SIM and based on the geographical location, current values of one or more third parameters, wherein the third parameters obtained for the first SIM are applicable in relation to the first SIM only and the third parameters obtained for the second SIM are applicable in relation to the second SIM only, and wherein the current values of the third parameters are based on values of the third parameters associated with the geographical location and uploaded to the server by a plurality of other wireless communication devices;

receiving a SIM utilization request from an application of the wireless communication device; and selecting one of the first SIM and the second SIM for utilization by the application based on the current values of the first parameters, the second parameters, and the third parameters;

wherein the one or more second parameters comprise one or more of a price plan of the subscription, a distance to a base station of the wireless communication system, a bandwidth of the wireless communication system, a latency of the wireless communication system, a signal strength of the wireless communication system, and a signal-to-interference ratio of the wireless communication system.

9. A subscriber identity module (SIM) selector for a wireless communication device connectable to a first SIM associated with a first subscription in relation to a first wireless communication system and a second SIM associated with a second subscription in relation to a second wireless communication system, the SIM selector comprising:

one or more current parameter value inputs adapted to:

obtain current values of one or more first parameters, wherein the first parameters are applicable in relation to the first SIM and in relation to the second SIM, and wherein the one or more first parameters comprise a geographical location of the wireless communication device;

obtain, for each of the first SIM and the second SIM, current values of one or more second parameters, wherein the second parameters obtained for the first SIM are applicable in relation to the first SIM only and the second parameters obtained for the second SIM are applicable in relation to the second SIM only; and obtain, from a remote server and for at least one of the first SIM and the second SIM and based on the geographical location, current values of one or more third parameters, wherein the third parameters obtained for the first SIM are applicable in relation to the first SIM only and the third parameters obtained for the second SIM are applicable in relation to the second SIM only, and wherein the current values of the third parameters are based on values of the third parameters associated with the geographical location and uploaded to the server by a plurality of other wireless communication devices;

an application interface adapted to receive a SIM utilization request from an application of the wireless communication device; and a selection unit adapted to select one of the first SIM and the second SIM for utilization by the application based on the current values of the first parameters, the second parameters, and the third parameters;

wherein the one or more second parameters comprise one or more of a price plan of the subscription, a distance to a base station of the wireless communication system, a bandwidth of the wireless communication system, a latency of the wireless communication system, a signal strength of the wireless communication system, and a signal-to-interference ratio of the wireless communication system.

10. The SIM selector of claim 9 wherein one or more of the current parameter value inputs are operatively connectable to a receiver of the wireless communication device for obtaining the current values of one or more third parameters by receiving the current values of the one or more third parameters from the remote server.

11. The SIM selector of claim 9, further comprising one or more current parameter value outputs operatively connectable to a transmitter of the wireless communication device for transmitting one or more of the current values of the one or more second parameters to the remote server for updating corresponding third parameters of the remote server.

12. The SIM selector of claim 9, further adapted to update the current values of the one or more second parameters based on measurements performed during communication using the selected SIM.

13. The SIM selector of claim 9, wherein the selection unit is adapted to further base the selection of one of the first SIM and the second SIM for utilization by the application on one or more application specific parameters.

14. The SIM selector of claim 9, wherein the selection unit is adapted to select one of the first SIM and the second SIM for utilization by the application by:

assigning a parameter specific rating to each of the first SIM and the second SIM for each of the current values of the first parameters, the second parameters, and the third parameters;

accumulating the parameter specific ratings for each of the first SIM and the second SIM; and selecting the first SIM if its accumulated rating indicates that it is more favorable than the second SIM and selecting the second SIM otherwise.

15. A wireless communication device comprising the arrangement according to claim 9.

* * * * *